3,185,720
ASYMMETRIC THIOLCARBAMATES
Harry Tilles, El Cerrito, and Joe Antognini, Mountain View, Calif., assignors to Stauffer Chemical Company, a corporation of Delaware
No Drawing. Filed Aug. 21, 1962, Ser. No. 218,426
5 Claims. (Cl. 260—455)

This application is a continuation-in-part of our application Serial No. 633,529, filed January 11, 1957, now abandoned.

This invention relates to certain novel compositions of matter and more particularly relates to certain alkyl-N,N-dialkylthiolcarbamates wherein the two N-bonded alkyl radicals are different. Thus, the compounds of the present invention differ from the compounds of our Patent 2,913,327 in having asymmetric substituents on the nitrogen atom.

It has been found that the compounds having asymmetric substituents have a much higher safety factor on certain important crops than do the corresponding symmetric compounds of Patent 2,913,327. On crops such as sugar beets, tomatoes, strawberries, spinach and soy beans, the symmetric compounds, if used in sufficient quantity to be effective herbicides, cause a severe reduction in the desired crop, so that the use of the symmetric compounds on such crops is economically unfeasible. The most widely used of the compounds claimed in 2,913,327, namely ethyl-di-n-propylthiolcarbamate, causes a severe reduction in yield of sugar beets, while the compounds of the present invention not only act as effective herbicides but actually increase the yield. Further, the asymmetric compounds of the present invention leave no residue on the desired crop, and the effects disappear from the soil rapidly so that there is no carryover to a subsequent crop.

The compounds of the present invention have the formula

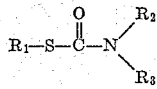

wherein $R_1$ is selected from ethyl and n-propyl radicals, wherein $R_2$ is an ethyl radical, and wherein $R_3$ is selected from n-butyl and cyclohexyl radicals. A preferred grouping of the compounds is that in which $R_3$ is n-butyl.

The following examples illustrate methods by which the compounds of the invention can be made (code numbers have been assigned to the various compounds and are used hereinafter):

Example I (R–2060)

About 10 g. (0.08 mol) of ethyl chlorothiolformate was dissolved in 125 cc. of ethyl ether and the solution was cooled in an ice bath to 5° C. To this mixture was then slowly added 16.7 g. (0.165 mol) of N-ethyl-n-butylamine. The precipitated amine hydrochloride was then removed by filtration and the filter cake was washed with a little ether. The washings were combined with the original filtrate and the ether solution of product was concentrated on a steam bath. The residual liquid was transferred to a 50 cc. round-bottom flask and the solvent was completely removed at 25° C. and 25 mm. Hg pressure by means of a Rinco Rotating film evaporator. There was obtained 12.0 g. (79% yield) of ethyl ethyl-n-butyl-thiolcarbamate, $N_D^{25}$ 1.4758.

Example II (R–2061)

When the general procedure of Example I was repeated except that 14.9 g. (0.148 mol) of N-ethyl-n-butylamine and 10 g. (0.72 mol) of n-propyl chlorothiolformate were employed, there was obtained 14.0 g. (96% yield) of n-propyl ethyl-n-butylthiolcarbamate, $N_D^{25}$ 1.4742.

Example III (R–2063)

When the general procedure of Example I was repeated except that 21 g. (0.165 mol) of N-ethyl cyclohexylamine and 10 g. (0.080 mol) of ethyl chlorothiolformate were employed, there was obtained 15.9 g. (91.8% yield) of ethyl ethylcyclohexylthiolcarbamate, $N_D^{25.5}$ 1.5069.

Example IV (R–2064)

When the general procedure of Example I was repeated except that 18.8 g. (0.148 mol) of N-ethyl cyclohexylamine and 10 g. (0.072 mol) of n-propyl chlorothiolformate were employed, there was obtained 15.4 g. (93.5% yield) or n-propyl ethylcyclohexylthiolcarbamate, $N_D^{25.5}$ 1.5031.

The compounds of the present invention are ordinarily applied as pre-plant treatments to the soil. Although the compounds can be applied in their pure form, it is ordinarily more convenient to formulate the compounds in the form of an emulsifiable concentrate and apply an aqueous emulsion made therefrom to secure uniform application. The compounds can also be formulated as solutions, dusts, or wettable powders. The compounds are normally mixed into about the top two or three inches of soil, using harrows, disks or similar agricultural tools. Planting can immediately follow application and, in many instances, the compounds can be applied and the seeds planted using a single tool. For economy, the compound is often not applied to an entire field but is applied as a narrow band straddling the seeded area, leaving the space between bands to be treated by the usual mechanical weed control methods. The rate of application of the active compounds is from about 2 to 20 pounds per acre and in most instances a rate of application of from about 4 to about 8 pounds per acre will give effective weed control without damage to the desired crop. The treatment rates per acre are based on the actual area treated, so that if the compound is applied in narrow bands, the rate of application per field acre will be much lower than that indicated.

The following example shows the effectiveness and safety of two compounds of the present invention as compared with the compound ethyl di-n-propylthiolcarbamate, the best compound from Patent 2,913,327. This compound has the code designation R–1608 and is sold under the registered trademark EPTAM. In this series of tests, fields were planted to sugar beets near Freeport, California. After applying the compound to the soil as an emulsion of the compound in water, the compound was incorporated in the soil by going over the soil with a spike-tooth harrow and a ring roller twice, the treatments being at right angles to each other. The rate of application was 2 and 4 pounds per acre. The soil involved was heavily infested with water grass and lamb's-quarter. At 2 pounds per acre, none of the compounds gave more than fair control of lamb's-quarter, while at 4 pounds per acre, all of the compounds gave excellent control of both water grass and lamb's-quarter. However, at an application rate of 4 pounds per acre, the growth of sugar beets was only 70% of normal with compound R-1608, while it was 100% normal with the compounds R-2060 and R-2061.

In the same series of tests, tests were made to see whether there was a chemical residue in the soil which would interfere with subsequent crops. Samples of the soil were taken 12 weeks after application and planted to oats. In the case of compound R-1608 at 4 pounds per acre, germination was severely reduced, while with compounds R-2060 and R-2061, at the same rate, germination was completely normal.

In the above series of tests, five random samples were obtained, each from the plot treated with R-2061 and from a check plot which had not received any chemical treatment. The plot treated with R-2061 had been treated at the rate of 4 pounds per acre. On the check plot, the yield of beets was 9.57 tons per acre, while on the treated plot the yield was 10.95 tons per acre, and the sucrose content of the treated beets was higher, so that the over-all yield on the check plot was only 2,603.9 pounds of sugar per acre, while on the treated plot the yield was 3,122.1 pounds of sugar per acre.

Similar tests were made on tomatoes. At an application rate of 6 pounds per acre, compound R-2061 gave a normal yield of tomatoes and gave excellent control of red root pig weed, water grass, purslane and lamb's-quarter. In the same field, application rates of compound R-1608 killed all of the tomato plants at application rates of 3 and 6 pounds per acre.

In another series of tests the seeds of various plants were planted in 3″ diameter paper cans in Santa Cruz loam. The cans were watered and an amount of each compound was applied as an acetone solution to each can which would correspond to a rate of application of 3 pounds per acre of the actual compound under test. Similar controls were planted and all of the cans were maintained in a greenhouse, watered as needed and the germination and growth of the treated cans were compared with the controls. Germination was reported on a scale of 0–100 and growth on a scale of 0–10; 100 and 10 represent, respectively, no deviation from the control. The following data were obtained:

| Compound | Red oats | | Pigweed | | Sudan grass | | Nut grass | | Yellow foxtail | | Quack grass | | Water grass | |
|---|---|---|---|---|---|---|---|---|---|---|---|---|---|---|
| | Ge. | Gr. | Ge. | Gr. | Ge. | Gr. | Ge. | Gr. | Ge. | Gr. | Ge. | Gr. | Ge. | Gr. |
| R-2060 | 100 | 0+ | 100 | 7 | 100 | 0+ | 0 | | 100 | 0+ | 100 | 0+ | 100 | 0+ |
| R-2061 | 100 | 1 | 0 | | 0 | | 0 | | 100 | 0+ | 0 | | 100 | 0+ |
| R-2063 | 100 | 1 | 100 | 2 | 0 | | 0 | | 0 | | 100 | 0+ | 100 | 0+ |
| R-2064 | 100 | 3 | 100 | 3 | 100 | 1 | 0 | | 100 | | 100 | 1 | 100 | 0+ |

In other tests, compound R-2063 was applied at 4 pounds per acre on spinach and germination and growth were completely normal, while weed control was excellent. Compound R-2064 gave excellent weed control on soy beans at 3 pounds per acre, with 100% germination and 90% growth of the desired crop. At these rates, R-1608 gave severe reduction in the desired crop.

We claim:
1. A compound of the formula

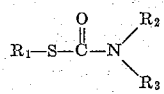

wherein $R_1$ is selected from ethyl and n-propyl radicals, wherein $R_2$ is an ethyl radical and wherein $R_3$ is selected from n-butyl and cyclohexyl radicals.

2. As a compound ethyl ethyl-n-butylthiolcarbamate.
3. As a compound n-propyl ethyl-n-butylthiolcarbamate.
4. As a compound ethyl ethylcyclohexylthiolcarbamate.
5. As a compound n-propyl ethylcyclohexylthiolcarbamate.

References Cited by the Examiner
UNITED STATES PATENTS 2,913,326  11/59  Tilles et al. _____ 260—455
2,913,327  11/59  Tilles et al. _____ 260—455

CHARLES B. PARKER, *Primary Examiner.*
DANIEL D. HORWITZ, *Examiner.*